United States Patent [19]
Haskal

[11] Patent Number: 6,023,352
[45] Date of Patent: Feb. 8, 2000

[54] METHODS AND SYSTEMS FOR THERMAL FIXING AND/OR ERASING OF HOLOGRAMS

[75] Inventor: Haim M. Haskal, Chestnut Hill, Mass.

[73] Assignee: University of Massachusetts, Boston, Mass.

[21] Appl. No.: 09/132,880

[22] Filed: Aug. 11, 1998

[51] Int. Cl.$^7$ .................................................. G03H 1/02
[52] U.S. Cl. ................................... 359/3; 359/1; 359/10; 359/27; 430/1; 430/2
[58] Field of Search .................................... 359/3, 4, 5, 7, 359/10, 27; 356/347, 350; 430/1, 2

[56] References Cited

U.S. PATENT DOCUMENTS 5,335,098  8/1994  Leyva et al. .
5,648,856  7/1997  Stoll ............................................ 359/7

OTHER PUBLICATIONS

Amondei et al., "Holographic Pattern Fixing in Electro–optic Crystals," *Applied Physics Letters*, 18:540–542, Jun. 15, 1971.
Heanaue et al., "Digital Holographic Storage System Incorporating Thermal Fixing in Lithium Niobate," *Optics Letters*, 21:1615–1617, Oct. 1, 1996.
Liu et al., "Local Thermal Fixing of a Photorefractive $LiNbO_3$ Hologram by Use of a $CO_2$ Laser," *Applied Optics*, 37:1342–1349, Mar. 10, 1998.
Nassau et al., "Ferroelectric Lithium Niobate. 2. Preparation of Single Domain Crystals," *J. Phys. Chem. Solids*, 27:989–996, Oct. 5, 1965.
Rybaltowski et al., "High Power InAsSb/InPAsSb/InAs Mid–Infrared Lasers," *Applied Phys. Lett.*, 71:2430–2432, Oct. 27, 1997.
Staebler et al., "Multiple Storage and Erasure of Fixed Holograms in Fe–doped $LiNbO_3$," *Applied Phys. Lett.*, 26:82–184, Feb. 15, 1975.

*Primary Examiner*—Cassandra Spyrou
*Assistant Examiner*—Craig Curtis
*Attorney, Agent, or Firm*—Fish & Richardson P.C.

[57] ABSTRACT

The invention features methods and systems for thermally fixing or erasing a laser-induced hologram in a photorefractive material, for example, by directing laser radiation having a wavelength through a thickness of the photorefractive material containing the hologram, wherein the wavelength is selected such that the photorefractive material absorbs a portion of the laser radiation and transmits another portion of the laser radiation. The transmitted laser radiation can be redirected back through the hologram, wherein both the laser radiation directed and redirected to the hologram are sufficiently absorbed by the photorefractive material to thermally fix or erase the hologram.

34 Claims, 1 Drawing Sheet

METHODS AND SYSTEMS FOR THERMAL FIXING AND/OR ERASING OF HOLOGRAMS

FIELD OF THE INVENTION

This invention relates to holography and optical storage, and in particular to methods and systems for the thermal fixing of holograms.

BACKGROUND OF THE INVENTION

Volume holograms in photorefractive crystals have generated substantial interest recently for possible applications in high capacity optical storage and optical interconnects. In particular, optical memories based on such volume holograms can potentially combine very large capacities, e.g., greater than 1 Tbyte, with very high data rates, e.g., greater than 1 Gbit/s, and very short access times, e.g., shorter than 1 ms.

A volume hologram can be written in a photorefractive crystal, e.g., iron-doped lithium niobate ($Fe:LiNbO_3$), by crossing laser beams, e.g., a signal carrying beam and a reference beam, having wavelengths that are absorbed by the crystal. The interference pattern formed by the crossed beams records a corresponding diffraction pattern, i.e., a hologram, in the crystal. A subsequent "read" beam incident on the crystal at a correct angle, e.g., an angle for Bragg diffraction, diffracts from the hologram and reconstructs the signal-carrying beam. A large number of holograms can be recorded in a photorefractive crystal by directing the write and read beams into the crystal at different angles, which is known as angle multiplexing.

In many cases, the write beams initially produce an electronic hologram in which local variation in the density and/or quantum state of electrons or holes in the crystal form the hologram. For example, the optical intensity pattern produced by the write beams can generate free carriers, either electrons or holes, which are trapped at local defect sites to form the hologram. Unfortunately, the electronic grating are volatile and can degrade upon repeated use of reading beams and exposure to moderate temperatures and ambient light. However, thermal fixing of electronic holograms can be used to overcome such volatility.

Thermal fixing involves exchanging electronic holograms with ionic holograms, i.e., holograms formed from ions. Typically, one places the crystal containing the electronic holograms into a high-temperature oven, e.g., greater than 100 degrees Celsius. At such high temperatures, ionic charges become mobile and migrate to the electronic charges that form the electronic hologram thereby compensating the refractive index variations caused by the trapped electronic charges. As a result, there is minimal, if any, diffraction of a read beam at the end of the thermal heating process. After the crystal is cooled, a uniform light beam illuminates the crystal and excites the electronic charges that form the electronic hologram into free carriers. These free carriers migrate uniformly over the crystal volume to reveal a stable ionic hologram. If desired, the ionic hologram can be erased by heating the crystal to even higher temperatures that free the ionic charges that form the ionic hologram, thereby "washing" away the hologram.

Recently, B. Liu et al. (*Applied Optics*, 37:1342–1349, 1998)described using 10.6 micron radiation from a $CO_2$ laser to thermally fix a hologram written in a 2 mm thick $Fe:LiNbO_3$ crystal. The crystal strongly absorbed the 10.6 micron radiation with the absorption constant measured to be between 5000 and 10,000 $m^{-1}$. The laser radia ion rapidly and efficiently heated the crystal within its first few hundred microns of thickness, at which point the laser radiation was fully absorbed. Thereafter, thermal conduction within the crystal carried the heat through the thickness of the crystal, thereby thermally fixing the hologram. In some experiments, copper absorbers were introduced into the crystal to more rapidly conduct the heat through the thickness of the crystal.

SUMMARY OF THE INVENTION

The invention features systems and methods for thermally fixing and erasing holograms using laser radiation. The wavelength of the laser radiation is selected such that the laser radiation propagates through the entire thickness of the crystal without being fully absorbed. Thus, the laser radiation directly heats the entire thickness of the hologram to fix and/or erase the hologram. Furthermore, in some embodiments, laser radiation transmitted through the crystal is reflected back towards and through the hologram to further heat and fix the hologram. Such a reflection more efficiently converts the laser radiation into heat and more uniformly heats opposite ends of the crystal.

In general, in one aspect, the invention features a method for thermally fixing or erasing a laser-induced hologram in a photorefractive material, such as a crystal of iron-doped lithium niobate. The method includes directing laser radiation having a wavelength $\lambda_F$ through a thickness of the photorefractive material containing the hologram, wherein the photorefractive material absorbs a portion of the laser radiation and transmits another portion of the laser radiation; and redirecting the transmitted portion of the laser radiation back through the hologram, wherein the laser radiation directed and redirected to the hologram are sufficiently absorbed by the photorefractive material to thermally fix or erase the hologram.

In some embodiments, $\alpha(\lambda_F)d$ is in the range of about 0.05 to 2.0, and in some cases 0.1 to 1.0, or 0.2 to about 0.8, where d is the thickness of the photorefractive material and $\alpha(\lambda_F)$ is the absorption of the photorefractive material at the wavelength $\lambda_F$.

In another aspect, the invention features an additional method for thermally fixing or erasing a laser-induced hologram in a photorefractive material. The method includes directing laser radiation having a wavelength $\lambda$ through a thickness d of the photorefractive material containing the hologram, wherein $\alpha(\lambda)$ is the absorption of the photorefractive material at the wavelength $\lambda$, $\alpha(\lambda)d$ is in the range of about 0.1 to 1.0, and the laser radiation directed to the hologram is sufficiently absorbed by the photorefractive material to thermally fix or erase the hologram. In some embodiments, $\alpha(\lambda)d$ is in the range of about 0.2 to 0.8.

Embodiments for either of the methods described above can include any of the following features.

The laser radiation can be produced by a diode laser or a frequency-doubled $CO_2$ laser. The wavelength of the laser radiation can be in the range of about 1.6 to 11 microns, and in some embodiments in the range of about 3 to 8 microns. The photorefractive material can have a thickness d greater than or equal to about 0.5 cm, or 0.6, 0.8, or 1.0 cm. The methods can further include directing revelation laser radiation towards the photorefractive material, the revelation laser radiation having a wavelength that excites electrons within the photorefractive material to reveal the thermally fixed ionic hologram.

In general, in another aspect, the invention features a system for thermally fixing or erasing a laser-induced hologram in a photorefractive material. The system includes a mount which during operation supports the photorefractive material; a laser source which during operation directs laser radiation through a thickness of the photorefractive material containing the hologram, the laser radiation having a wavelength $\lambda_F$ selected such that the photorefractive material absorbs a portion of the laser radiation and transmits another portion of the laser radiation; and a reflective optic which during operation redirects the transmitted portion of the laser radiation back through the hologram, wherein the laser radiation directed and redirected through the hologram are sufficiently absorbed by the photorefractive material to thermally fix or erase the hologram.

In another aspect, the invention features a system for thermally fixing or erasing a laser-induced hologram. The system includes a mount which during operation supports a photorefractive material; and a laser source which during operation directs fixing laser radiation through a thickness of the photorefractive material, the fixing laser radiation having a wavelength $\lambda_F$ such that the photorefractive material absorbs a portion of the laser radiation and transmits another portion of the laser radiation, wherein d is the thickness of the photorefractive material, $\alpha(\lambda_F)$ is the absorption of the photorefractive material at the wavelength $\lambda_F$, $\alpha(\lambda_F)$ d is in the range of about 0.1 to 1.0, and the laser radiation directed through the hologram is sufficiently absorbed by the photorefractive material to thermally fix or erase the hologram. In some embodiments, $\alpha(\lambda_F)d$ is in the range of about 0.2 to 0.8.

Embodiments of the systems described above can have any of the following features.

The systems can include the photorefractive material, e.g., a crystal of iron-doped lithium niobate. The laser source can be a diode laser of a frequency-doubled $CO_2$ laser. The laser radiation can deliver an energy density to the photorefractive material greater than or equal to about 1 $J/mm^3$. The wavelength $\lambda_F$ of the laser radiation can be in the range of about 1.6 to 11 microns, and in some cases, in the range of about 3 to 8 microns. The photorefractive material can have a thickness greater than or equal to about 0.5 cm, or larger, e.g., 1.0 cm. The systems can further include a revelation laser source which during operation directs revelation laser radiation towards the photorefractive material, the revelation laser radiation having a wavelength that excites electrons within the material. The wavelength of the revelation laser radiation can be in the visible region of the electromagnetic spectrum.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The invention includes a number of advantages. For example, embodiments of the invention provide direct heating of a hologram by laser radiation to sufficiently fix and/or erase the hologram. This minimizes any need to rely on thermal conduction within the photorefractive material, e.g., by introducing metal absorbers, which may be impractical. Moreover, direct heating by laser radiation fixes and/or erases the hologram more rapidly and uniformly than thermal conduction. Furthermore, by using a laser for thermal heating, holograms can be fixed and/or erased in situ within a selected volume of the photorefractive material, and holograms within even very large materials, e.g., a size of about 1 $m^2$ by 1 cm, can be fixed and erased. In addition, by reflecting laser radiation transmitted through the material back toward the hologram, the hologram is more uniformly and efficiently heated, thereby increasing the robustness of the thermal fixing and/or erasing.

Other features and advantages of the invention will be apparent from the following detailed description, and from the claims.

DETAILED DESCRIPTION

Figure 1:
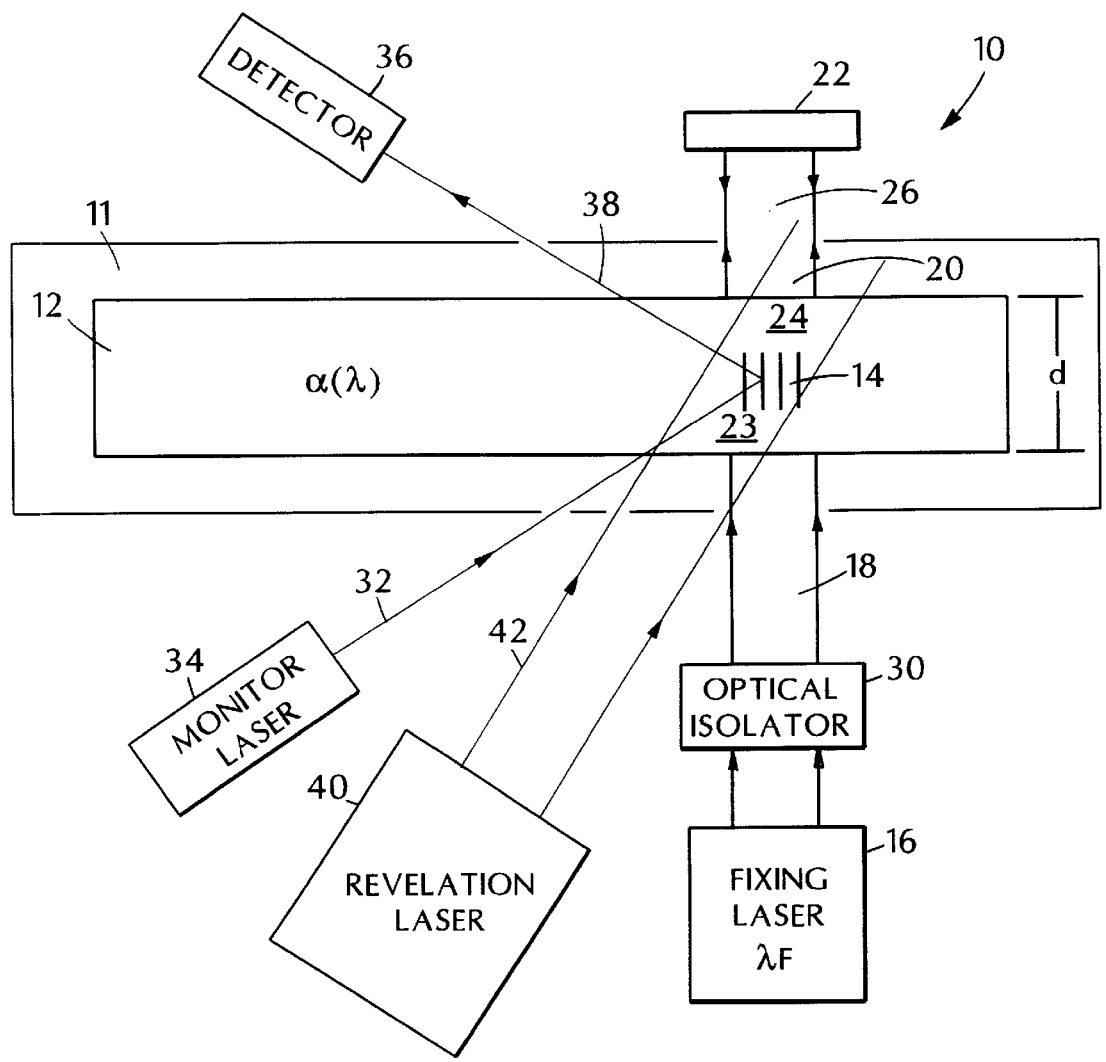
FIG. 1 is a schematic diagram of an apparatus for thermally fixing and/or erasing holograms in a photorefractive crystal.

The invention features methods and systems for thermally fixing and erasing a hologram by directly heating the hologram using laser radiation. Rather than relying on thermal conduction within a photorefractive crystal supporting the hologram, the wavelength of the laser radiation is chosen such that the laser radiation propagates through the entire thickness of the hologram and directly heats the hologram all along its path through the crystal. Thus, thermal fixing and/or erasing of the hologram is more rapid and spatially uniform, covering a volume within the crystal corresponding to the path of the laser radiation. To more efficiently and uniformly heat the hologram a reflective optic can be used to retroreflect the portion of the laser radiation transmitted through the thickness of the crystal containing the hologram back towards the hologram.

General System

FIG. 1 shows a schematic diagram of a system 10 for thermally fixing electronic holograms. A mount 11 supports a photorefractive crystal 12, e.g., iron-doped lithium niobate ($Fe:LiNbO_3$), having a thickness d and a wavelength dependent absorption $\alpha(\lambda)$. Crystal 12 includes an electronic volume hologram 14 formed by, e.g., crossing two write laser beams (not shown) to form an optical interference pattern. Suitable write laser beams for $Fe:LiNbO_3$ include, e.g., 514 nm laser beams from an Argon ion laser. The write beams excite electronic carriers, e.g., electrons and/or holes, in regions corresponding to the optical interference pattern.

A fixing laser 16, e.g., an infrared diode laser, directs laser radiation 18 having a wavelength $\lambda_F$ to the region of crystal 12 containing electronic hologram 14. The wavelength $\lambda_F$ is typically in the range of about 1.6 to 11 microns, e.g., wavelengths at which many photorefractive crystals are thermally excited. In particular, wavelengths in the range of about, e.g., 4–6 microns, can be suitable for $Fe:LiNbO_3$. Laser radiation 18 propagates through the thickness of crystal 12 and is partially absorbed as it propagates. The absorbed laser radiation generates local heating within the crystal in an amount proportional to the intensity of laser radiation 18, which decreases as the laser radiation propagates through the crystal and is absorbed. The relative decrease in the laser radiation at opposites ends of the crystal is related to the product $\alpha(\lambda_F)*d$. As described in the next section below, $\lambda_F$ is chosen such that this product is small enough that a significant portion, e.g., an amount in the range of about 40% to 80%, of laser radiation 18 is transmitted through the crystal producing transmitted radiation 20. Thus, the laser radiation 18 propagates through the entire thickness of crystal 12 and directly heats electronic hologram 14 with a relatively uniform longitudinal intensity profile, e.g., one that varies by less than an order of ten.

In some embodiments, a reflective optic 22, e.g., mirror useful for infrared wavelengths such as a gold, copper, or aluminum coated mirror, retroreflects transmitted laser radiation 20 back towards hologram 14. An optical isolator 30 prevents retroreflected laser radiation 26 transmitted through crystal 12 from reaching and destablizing fixing laser 16. Alternatively, the reflective mirror can introduce a small offset angle in the retroreflected beam that prevents the retroreflected beam from reaching the fixing laser. The retroreflected laser radiation 26 is further absorbed by the crystal, thereby further heating the crystal and more efficiently converting the laser radiation from fixing laser 16 into local heating of hologram 14. Since laser radiation 18 decreases in intensity from the front face 23 to the back face 24 of the crystal and retroreflected laser radiation 26 decreases in intensity in the opposite direction, retroflecting transmitted laser radiation also produces a more uniform longitudinal laser intensity profile, and thus more uniform heating of hologram 14.

During use, fixing laser 16 directs laser radiation 18 toward hologram 14 with an intensity and duration sufficient to heat crystal 12 to a temperature at which thermally-excited ions can migrate to and compensate for the electronic charges that form the electronic hologram. For example, for Fe:LiNbO$_3$ a suitable laser intensity and duration may be on the order of 5 W and 60 seconds in a 5 mm spot size. A monitor beam 32 from, e.g., a low-power HeNe laser 34 at 633 nm, can monitor the compensation of electronic hologram 14 by observing its diffraction (diffracted beam 38) from the hologram, which is measured by a detector 36. Prior to fixing the diffracted signal is largest, and then, as the fixing laser generates sufficient heat for ions to migrate to and compensate the electronic hologram, the diffracted signal decreases to a minimum. Thereafter, the compensated hologram may be allowed to cool, and then a revelation laser 40 illuminates hologram 14 with a uniform revelation beam 42 having a wavelength that excites electronic charges and washes away the electronic hologram revealing a more stable ionic hologram. As a results, the diffracted signal from monitor beam 32 increases indicating the formation of the ionic hologram. In some embodiments, revelation laser 40 and the laser source initially forming the electronic hologram are the same, e.g., an argon ion laser operating at 514 nm.

System 10 can also be used to erase previously fixed ionic holograms. In this case, fixing laser 16 directs laser radiation with a sufficient intensity and duration to uniformly heat the ionic hologram to an erasing temperature which thermally excites the ions and washes away the ionic hologram. The erasing temperature is greater than the fixing temperature and subsequent use of revelation beam 42 is not required. Decrease in the diffracted signal from monitor beam 32 can be used to monitor the erasure of a hologram by fixing laser 16. Erasing can be performed in situ and can be very rapid, e.g., less than 10 s for temperatures on the order of 300° C.

The precise parameters, e.g., wavelengths, intensities, and pulse duration or continuous wave (cw) fluence, for the fixing, writing, and revelation lasers depends on the properties of the photorefractive crystal, e.g., its thickness, absorption, heat capacity, damage thresholds, and fixing and erasing temperatures. Suitable writing lasers for generating electronic holograms in Fe:LiNbO$_3$ are well known in the art, e.g., an argon ion laser operating at 514 nm at about 2 W/cm$^2$ can produce electronic holograms in about 5 s. Also see, e.g., F. H. Mok, "Angle-multiplexed storage of 5000 holograms in lithium niobate" (*Opt. Lett.*, 18:915–917, 1993). Providing substantially uniform and direct laser heating through the thickness of the crystal with fixing laser 16 depends on the dimensionless product $\alpha(\lambda_F)*d$, which, as described in the section below, is typically in the range of about 0.05 to 2.0, and sometimes in the range of about 0.1 to 1.0. Under such conditions, especially if reflective optic 22 is used, the longitudinal profile of the energy absorbed from laser radiation 18 and retroreflected laser radiation 26 is relatively uniform along the thickness of the crystal. The temperature increase along the thickness of the crystal depends on this longitudinal profile, and also on the exposure time, absorption $\alpha(\lambda_F)$, heat capacity $C_p$ of the crystal, and thermal diffusivity of the crystal.

The temperature required for fixing and/or erasing a hologram in a given crystal can be determined empirically, using, e.g., monitor beam 32, or estimated from literature values, see, e.g., D. L. Staebler et al. (*Appl. Phys. Lett.*, 26:183, 1975). For example, for Fe:LiNbO$_3$, a suitable fixing temperature is 200° C. for a period of about 1 second. The wavelength-dependent absorption of the photorefractive crystal can be determined empirically using conventional optical absorption experiments or using literature values, e.g., for Fe:LiNbO$_3$ see, e.g., K. Naussau et al. (*J. Phys. Chem Solids*, 27:989–996, 1966).

System 10 provides a number of advantages. For example, since the laser radiation from fixing laser 16 propagates through the entire thickness of the crystal, the hologram is directly heated by the fixing laser radiation. Thus, the heating is rapid and does not depend on thermal conduction within the crystal to raise the temperature of the hologram to above a fixing or erasing temperature. Furthermore, since the heating is rapid, the thermal fixing and erasing is rapid and there is little transverse thermal conduction to regions of the crystal not illuminated by the fixing laser radiation. As a result, the system provides fixing and erasing within a selected area of the crystal, making the system suitable for selectively fixing and erasing multiple holograms supported in very large, e.g., 1 m$^2$ by 1 cm, crystals used in large scale photorefractive memory systems.

Mathematical Description

As laser radiation 18 propagates through the thickness of crystal 12, e.g., along a z-axis, the intensity of the laser radiation I(z) decreases because of absorption $\alpha_F=\alpha(\lambda_F)$ at the fixing wavelength $\lambda_F$. As a result, the longitudinal intensity profile of laser radiation 18 is given by $I(z)=I_0*\exp(-\alpha_F z)$ where $I_0$ gives the intensity emitted by fixing laser 16. The energy absorbed by the crystal per unit volume per unit time, $\Delta I(z)$ is given by:

$$\Delta I(z)=\alpha_F*I_0*\exp(-\alpha_F z) \quad (1)$$

Thus, the ratio between the energy absorbed at the front and back faces of the crystal is given by $\Delta I(z=d)/\Delta I(z=0)=\exp(-\alpha_F d)$.

The fixing laser is chosen such that the fixing wavelength $\lambda_F$ corresponds to an absorption $\alpha_F$ that makes the product $\alpha_F d$ small enough, e.g., between about 0.1 and 1.0 such as about 0.7, to produce a substantially uniform longitudinal profile for absorbed energy, e.g., variations less than a factor of 10, and large enough that, given the laser intensity $I_0$, a sufficient amount of laser radiation is absorbed to thermally fix and/or erase a hologram.

By using reflective mirror 22 to double pass the laser radiation, the double pass longitudinal laser intensity profile, $I_{dp}(z)$, and the energy absorbed by the crystal per unit volume per unit time, $\Delta I_{dp}(z)$, are given by, respectively:

$$I_{dp}(z)=I_0*\{\exp[-\alpha_F z]+\exp[-\alpha_F(2d-z)]\} \quad (2)$$

$$\Delta I_{dp}(z)=\alpha_F*I_0*\{\exp[-\alpha_F z]+\exp[-\alpha_F(2d-z)]\} \quad (3)$$

In this case, the ratio between the energy absorbed at the front and back faces of the crystal is given by:

$$\Delta I_{dp}(z=d)/\Delta I_{dp}(z=0) = 2*\exp(-\alpha_F d)/[1+\exp(-2\alpha_F d)] \quad (4)$$

Thus, for a value of, e.g., $\alpha_F d=0.693$ for which $\exp(-\alpha_F d)=0.5$, the energy absorbed per unit volume per unit time decreases smoothly from a value of $1.25*\alpha_F*I_0$ at the front face to a value of $\alpha_F * I_0$ at the back face of the crystal, a variation of 20%, corresponding to a substantially uniform longitudinal profile for absorbed energy. Even more uniform profiles can be achieved by selecting $\lambda_F$ such that $\alpha_F d$ is smaller, e.g., $\alpha_F d$ equal to about 0.4.

In addition, $\lambda_F$ is selected such that the laser radiation is absorbed into bands of the photorefractive crystal that rapidly dissipate the optical excitation as heat. Suitable wavelengths typically include those in the infrared region, e.g., 1.6 to 11 microns, and in some cases, in the range of about 2 to 8 microns. Such wavelengths are provided by, e.g., $CO_2$ lasers, frequency-doubled $CO_2$ lasers, or diode lasers known in the art, such as described in A. Rybaltowski, "High power InAsSb/InPAsSb/InAs mid-infrared lasers," *Appl. Phys. Lett.*, 71:2430–2432 (1997).

The increase in temperature $\Delta T$ is given by:

$$\Delta T(z)=\Delta I_{dp}(z)*\tau/C_p \quad (5)$$

where $\tau$ is the fixing exposure time, $C_p$ is the heat capacity of the crystal in units of energy per unit volume per unit temperature, $\Delta I_{dp}$ is known from Equ. 3 or alternatively is replaced by $\Delta I$ from Equ. 1 for the case of a single pass, and $\tau$ is short enough to ignoring heat diffusion of the absorbed laser radiation. For example, for $Fe:LiNbO_3$, an intrinsic energy of about 0.5 $J/mm^3$ at a selected volume can raise the temperature to about 200° C. from room temperature, corresponding to a heat capacity $C_p$ of about 3 $mJ/°mm^3$. Such an intrinsic energy can be achieved by, e.g., exposing a 1 cm thick crystal to a 20 W laser beam having a 5 mm spot size for about 12 seconds, assuming that the crystal absorbs about half of the laser radiation to which it is exposed (corresponding to $\alpha_F d$ equal to about 0.35). In other embodiments, pulsed rather than continuous wave (cw) laser radiation can be used, and in some cases, using pulsed radiation for thermal fixing may be preferred, see, e.g., B. Liu et al., ibid.

In general, once the fixing laser is chosen such that the wavelength $\lambda_F$ produces a substantially uniform longitudinal laser intensity profile based on the value of $\alpha_F d$, the intensity and exposure time required to produce the appropriate fixing and/or erasing temperature can be determined from Equ. 5. Since the laser radiation directly heats the crystal, fixing times can be shorter than those that rely on thermal conduction in relatively thick crystals. Moreover, the absorbed energy produces fixing and/or erasure before there is significant transverse diffusion of the heat energy thereby more efficiently depositing laser energy into desired portions of the crystal. For example, $Fe:LiNbO_3$ has a thermal conductivity of about 0.019 $cm^2/s$, and thus for fixing and exposure times on the order of 10 s, the thermal diffusion length is on the order of 1 mm.

EXAMPLE

In the following non-limiting example, the double-pass arrangement shown in the FIG. 1 is used to thermally fix an electronic hologram having an area of about 5 $mm^2$ written by a 488 nm argon ion laser in a 0.5 cm thick, $Fe:LiNbO_3$ photorefractive crystal.

The fixing laser is a pulsed, frequency-doubled $CO_2$ laser emitting 12 ns pulses at 4.6 microns at 100 KHz, and having an average power of about 2.5 W and a 1.8 mm beam diameter. For example, such a suitable frequency-doubled $CO_2$ laser is commercially available from DEOS DeMaria ElectroOptics Systems (Bloomfield, Conn.) as Model DEOS-IR-2. The revelation laser is a 1 W argon ion laser operating at 488 nm, and the monitor laser is a 1 mW, linearly polarized HeNe laser operating at 633 nm.

The absorption $\alpha_F$ of the $Fe:LiNbO_3$ photorefractive crystal is estimated to be about 70 $m^{-1}$ at 4.6 microns producing a value for $\alpha_F d$ equal to about 0.35 for the 0.5 cm thick crystal. Such a value results in about half of the fixing laser energy being absorbed following the double pass and a variation in absorption between the front and back faces of the crystal of about 6%. Under these conditions, an exposure time of 2 seconds is sufficient to bring the crystal to a fixing temperature of about 200° C. and maintain that temperature for a time sufficient to fix the hologram, e.g., a time of about 1 second.

Other Embodiments

It is to be understood that while the invention has been described in conjunction with the detailed description thereof, that the foregoing description is intended to illustrate and not limit the scope of the invention, which is defined by the scope of the appended claims. For example, photorefractive crystals other than $Fe:LiNbO_3$, e.g, $BaTiO_3$, $Bi_{12}SiO_{20}$, and $LiTaO_3$, can be used as the photorefractive crystal.

Other aspects, advantages, and modifications are within the scope of the following claims.

What is claimed is:

1. A method for thermally fixing or erasing a laser-induced hologram in a photorefractive material, the method comprising:

directing laser radiation having a wavelength $\lambda_F$ through a thickness of the photorefractive material containing the hologram, wherein the photorefractive material absorbs a portion of the laser radiation and transmits another portion of the laser radiation; and redirecting the transmitted portion of the laser radiation back through the hologram, wherein the laser radiation directed and redirected to the hologram are sufficiently absorbed by the photorefractive material to thermally fix or erase the hologram.

2. The method of claim 1, wherein d is the thickness of the photorefractive material, $\alpha(\lambda_F)$ is the absorption of the photorefractive material at the wavelength $\lambda_F$, and $\alpha(\lambda_F)d$ is in the range of about 0.05 to 2.0.

3. The method of claim 1, wherein d is the thickness of the photorefractive material, $\alpha(\lambda_F)$ is the absorption of the photorefractive material at the wavelength $\lambda_F$, and $\alpha(\lambda_F)d$ is in the range of about 0.1 to 1.0.

4. The method of claim 1, wherein the laser radiation is produced by a diode laser.

5. The method of claim 1, wherein the laser radiation is produced by a frequency-doubled $CO_2$ laser.

6. The method of claim 1, wherein the photorefractive material has a thickness d greater than or equal to about 0.5 cm.

7. The method of claim 1, where the wavelength of the laser radiation is in the range of about 1.6 to 11 microns.

8. The method of claim 1, further comprising directing revelation laser radiation towards the photorefractive material, the revelation laser radiation having a wavelength that excites electrons within the material and reveals the thermally fixed ionic hologram.

9. A method for thermally fixing or erasing a laser-induced hologram in a photorefractive material, the method comprising:

directing laser radiation having a wavelength $\lambda_F$ through a thickness d of the photorefractive material containing the hologram, wherein $\alpha(\lambda_F)$ is the absorption of the photorefractive material at the wavelength $\lambda_F$, $\alpha(\lambda_F)d$ is in the range of about 0.1 to 1.0, and the laser radiation directed to the hologram is sufficiently absorbed by the photorefractive material to thermally fix or erase the hologram.

10. The method of claim 9, wherein $(\lambda_F)d$ is in the range of about 0.2 to 0.8.

11. The method of claim 9, wherein the laser radiation is produced by a diode laser.

12. The method of claim 9, wherein the laser radiation is produced by a frequency-doubled $CO_2$ laser.

13. The method of claim 9, wherein the photorefractive material has a thickness d greater than or equal to about 0.5 cm.

14. The method of claim 9, where the wavelength of the laser radiation is in the range of about 1.6 to 11 microns.

15. The method of claim 9, where the wavelength of the laser radiation is in the range of about 3 to 8 microns.

16. The method of claim 9, further comprising directing revelation laser radiation towards the photorefractive material, the revelation laser radiation having a wavelength that excites electrons within the material and reveals the thermally fixed ionic hologram.

17. A system for thermally fixing or erasing a laser-induced hologram in a photorefractive material comprising:

a mount which during operation supports the photorefractive material;

a laser source which during operation directs laser radiation through a thickness of the photorefractive material containing the hologram, the laser radiation having a wavelength $\lambda_F$ selected such that the photorefractive material absorbs a portion of the laser radiation and transmits another portion of the laser radiation; and a reflective optic which during operation redirects the transmitted portion of the laser radiation back through the hologram, wherein the laser radiation directed and redirected through the hologram are sufficiently absorbed by the photorefractive material to thermally fix or erase the hologram.

18. The system of claim 17, further comprising a revelation laser source which during operation directs revelation laser radiation towards the photorefractive material, the revelation laser radiation having a wavelength that excites electrons within the material.

19. The system of claim 18, wherein the wavelength of the revelation laser radiation is in the visible region of the electromagnetic spectrum.

20. The system of claim 17, wherein the laser source comprises a diode laser.

21. The system of claim 17, wherein the laser source comprises a frequency-doubled $CO_2$ laser.

22. The system of claim 17, wherein the laser radiation delivers an energy density to the photorefractive material greater than or equal to about 1 $J/mm^3$.

23. The system of claim 17, further comprising the photorefractive material.

24. The system of claim 23, wherein the photorefractive material has a thickness greater than or equal to about 0.5 cm.

25. The system of claim 23, wherein the photorefractive material comprises iron-doped lithium niobate.

26. The system of claim 17, wherein the wavelength $\lambda_F$ of the laser radiation is in the range of about 1.6 to 11 microns.

27. The system of claim 17, wherein the wavelength $\lambda_F$ of the laser radiation is in the range of about 3 to 8 microns.

28. A system for thermally fixing or erasing a laser-induced hologram comprising:

a photorefractive material containing the hologram;

a mount which during operation supports the photorefractive material; and a laser source which during operation directs fixing laser radiation through a thickness of the photorefractive material, the fixing laser radiation having a wavelength $\lambda_F$ such that the photorefractive material absorbs a portion of the laser radiation and transmits another portion of the laser radiation, wherein d is the thickness of the photorefractive material, $\alpha(\lambda_F)$ is the absorption of the photorefractive material at the wavelength $\lambda_F$, $\alpha(\lambda_F)d$ is in the range of about 0.1 to 1.0, and the laser radiation directed through the hologram is sufficiently absorbed by the photorefractive material to thermally fix or erase the hologram.

29. The system of claim 28, wherein $\alpha(\lambda_F)d$ is in the range of about 0.2 to 0.8.

30. The system of claim 28, further comprising a revelation laser source which during operation directs revelation laser radiation towards the photorefractive material, the revelation laser radiation having a wavelength that excites electrons within the photorefractive material.

31. The system of claim 28, wherein the wavelength of the laser radiation is in the range of about 1.6 to 11 microns.

32. The system of claim 28, wherein the wavelength of the laser radiation is in the range of about 3 to 8 microns.

33. The system of claim 28, wherein the laser source comprises a diode laser.

34. The system of claim 28, wherein the laser source comprises a frequency-doubled $CO_2$ laser.

* * * * *